United States Patent [19]

Valitsky

[11] 4,309,334

[45] Jan. 5, 1982

[54] THERMALLY-RESISTANT GLASS-FILLED ADHESIVE/SEALANT COMPOSITIONS

[75] Inventor: Robert A. Valitsky, Unionville, Conn.

[73] Assignee: Loctite Corporation, Newington, Conn.

[21] Appl. No.: 828,802

[22] Filed: Aug. 29, 1977

Related U.S. Application Data

[63] Continuation-in-part of Ser. No. 620,905, Oct. 8, 1975, abandoned.

[51] Int. Cl.³ .................................................. C08K 9/06
[52] U.S. Cl. ............................... 260/42.15; 260/37 N; 260/42.18; 260/42.52; 260/42.53; 521/54; 521/55
[58] Field of Search ...................... 204/159.16, 159.23; 260/2.5 B, 37 N, 42.53, 42.15, 42.18, 42.52, 42.53

[56] References Cited

U.S. PATENT DOCUMENTS

| | | | |
|---|---|---|---|
| 3,013,915 | 12/1961 | Morgan | 156/307 |
| 3,218,305 | 11/1965 | Krieble | 156/332 |
| 3,240,736 | 3/1966 | Beckwith | 156/329 |
| 3,287,197 | 11/1966 | Errede | 156/308 |
| 3,425,988 | 2/1969 | Gorman et al. | 156/331 |
| 3,607,825 | 9/1971 | Shannon | 260/37 N |
| 3,642,675 | 2/1972 | McKenzie | 260/37 N |
| 3,707,521 | 12/1972 | De Santis | 260/37 N |
| 3,725,355 | 4/1973 | Parrish et al. | 260/37 N |
| 3,825,518 | 7/1974 | Foster et al. | 260/77.5 CR |
| 3,891,523 | 6/1975 | Hisamatsu et al. | 260/77.5 CR |
| 3,932,311 | 1/1976 | Caldwell et al. | 156/327 |
| 3,971,753 | 7/1976 | Frechtling et al. | 260/42.14 |

*Primary Examiner*—Morton Foelak
*Attorney, Agent, or Firm*—Jean B. Mauro; Eugene F. Miller

[57] ABSTRACT

A glass filler comprising a mixture of glass microballoons, glass beads and, optionally, milled glass fibers, preferably in approximate equal proportion by weight, imparts greatly improved thermal cycling resistance to adhesives, such as acrylate-based, ultraviolet curing adhesives.

14 Claims, No Drawings

THERMALLY-RESISTANT GLASS-FILLED ADHESIVE/SEALANT COMPOSITIONS

This application is a continuation-in-part of Ser. No. 620,905, filed Oct. 8, 1975, now abandoned.

BACKGROUND OF THE INVENTION

1. Field of the Invention

This invention relates to certain glass-filled adhesive and/or sealant compositions having improved ability to resist degradation caused by thermal cycling.

2. Prior Art

Adhesive and sealant compositions based on acrylate and alkylacrylate monomers polymerizable by free-radical initiation are known in the art. Likewise, anaerobic compositions are known in the art (see, for example, U.S. Pat. Nos. 2,895,950, 3,043,820 and 3,218,305). Anaerobic compositions are characterized by their ability to remain liquid in the presence of air, but cure to a strong adhesive bond when air is excluded, as by assembling a mated nut and bolt to which the composition has been applied.

While serving many useful purposes, both standard acrylate compositions as well as anaerobic-type acrylate compositions have been limited in applicability due to degradation of adhesive strength caused by wide cyclical fluctuations in temperature, e.g., in the range of $-50°$ to $+180°$ F. or more.

It is well known in the art that various improvements in the properties of polymer compositions may be effected by inclusion in the composition of one or more inorganic fillers. Over the years, glass has proven to be a particularly useful and desirable filler because of its chemical inertness, relative cheapness, and resistance to water absorption, among others. Glass is available in a variety of forms, e.g., solid spheres or beads, hollow spheres or microballoons, nodules, flakes, powder and milled fibers. Each form tends to produce certain properties or has certain special uses. For example, beads tend to improve strength properties, abrasion resistance and dimensional stability; microballoons significantly reduce the bulk density of the filled composition; flakes provide moisture and corrosion resistance as well as decorativeness; fibers tend to increase some strength properties. For a more detailed treatment of filler technology, reference may be made to any of the numerous texts dealing with, e.g., thermoplastics, thermosets, molding, and adhesives; for instance, "Modern Plastics Encyclopedia," published annually by McGraw-Hill, Inc., New York, New York.

SUMMARY OF THE INVENTION

It has now been discovered that outstanding improvements in the ability of cured compositions to withstand degradation by broad fluctuations in temperature are achieved by incorporating into the curable form of such compositions certain forms of glass and in certain limited ratios. Thus, the invention is defined as a curable adhesive and sealant composition comprising:

(a) one or more free radical curable monomers or oligomers;
(b) an initiator of free radical polymerization in sufficient quantity to cause polymerization of the composition;
(c) a thixotropic agent in sufficient quantity to produce a sufficiently high viscosity to maintain the glass filler mixture in suspension at least for the period of time required for the composition to gel; and
(d) about 5–25% by weight of the total composition of a glass filler mixture consisting essentially of, by weight based on the total glass filler mixture:
 (1) about 5 to about 50% glass microballoons;
 (2) about 10 to about 50% glass beads;
 (3) 0 to about 50% milled glass fibers; and
 (4) 0 to about 40% glass powder or glass flakes;
said composition being curable through gaps of at least 5 mils and, when cured, forming a bond or seal which is resistant to destruction by thermal cycling.

In a preferred form, the free radical initiator comprises one or more known ultraviolet initiators, i.e., those compounds which produce free radicals under the action of ultraviolet radiation. In another preferred embodiment, the composition will contain in addition, a silane material, such materials being well known for their ability to enhance glass adhesion and resistance to degradation by moisture.

The invention also includes a method of sealing or bonding surfaces comprising applying to either or both of said surfaces the filled composition of this invention, placing said surfaces in abutting relationship and causing the composition to cure, as by application of sufficient ultraviolet radiation, heat, primer, or exclusion of oxygen (i.e., in the case of anaerobic formulations).

DETAILED DESCRIPTION OF THE INVENTION

The Filler

The key feature of this invention is the use as a filler of a mixture of glass forms, as follows:

(1) microballoons, about 5 to about 50%, preferably about 25 to about 35%
(2) beads, about 10 to about 50%, preferably about 25 to about 35%
(3) milled fibers, 0 to about 50%; preferably about 15 to about 35%
(4) powder or flakes, 0 to about 40%.

These percentages are by weight based upon the total mixture of all forms of glass. (Obviously, the composition of the mixture in terms of volume percentage would be substantially different because of the low density of the microballoons.) It has been found that the microballoons and beads are required components of the filler. While useful compositions fall in the range of about 20 to about 50%, by weight of the total filler, for each of these two filler types, the preferred binary mixture will have approximately equivalent amounts of each type. A more preferred embodiment of the invention, however, involves the inclusion in the filler mixture of a third filler form, namely, glass fibers. Useful glass fiber content ranges up to approximately 40% by weight of the filler mixture. The combination of balloons with beads, preferably further in combination with fibers, appears to be critical to the effectiveness of the mixture in producing a cured resin composition having greatly improved ability to withstand the degrading effects of thermal cycling. It will also be observed that the powder or flakes need not be present. Where used, their effect will be primarily to obtain property adjustments, e.g., in density or optical properties, or resistance to thermal cycling.

While the quantity ranges indicated above represent the extremes of concentration showing an improved thermal cycling resistance, it is highly preferred that each of the microballoons, beads and fibers constitute approximately 25–35% by weight, even more preferably, about 30–35% by weight. Optimum results tend to occur when each of the three required forms of glass is present in approximately equal amount, i.e., about 33⅓% by weight. The glass powder and/or flakes are preferably omitted entirely.

The reason why the particular combinations of these particular forms of glass provide superior results in not well understood. Without wishing to be bound to any specific theory, it may be hypothesized that these combinations of forms, when suspended in a fluid medium, assume a certain natural "packing" arrangement which, when permanently set by the curing of the medium, is capable of absorbing and distributing thermal stresses, and controlling distribution of strain energy, e.g., in crack propagation, so efficiently that the over-all bond between the abutting surfaces joined by the cured medium is not substantially interfered with. In addition, the presence of the filler mixture produces a thicker bond line, e.g., about 4–8 mils between the said abutting surfaces, which thicker bond line tends to be somewhat more flexible and resistance to differential thermal changes than a relatively thin (e.g., about 0–2 mils) bond line, notwithstanding the fact that the same, quite rigid, cured adhesive may be used.

The size and size distribution of the various required forms of glass, within the approximate limits specified, may be selected arbitrarily and optimized for any given application on the basis of straightforward experimentation. Particular success, however, has been obtained with the materials described in the examples, below, and these, therefore, constitute a preferred embodiment.

The glass mixture filler is included in the adhesive/-sealant composition in the amount of about 2 to about 25% or more by weight of the total composition. Below about 2%, no significant benefit is observed; above about 25%, there is no further significant improvement in resistance to thermal cycling degradation. Preferably, the filler concentration will be about 5 to 15% and more preferably, about 8 to 12%.

While all glass forms described in this invention are available commercially in both silanized and unsilanized types, the silanized type is preferred. As alternatives, any of the glass forms can be effectively silanized by the user according to known procedures, or any of various commercially available silanes can be incorporated into the glass-adhesive mixture.

The Monomer

The glass filler mixture of this invention is carried by, i.e., suspended in, a monomeric, free radical-curable liquid composition (which has also been referred to herein as the "medium"). While conveniently thought of as a "monomer" (in the sense that it may be polymerized), it will be understood that, depending upon the materials selected, the "monomer" may be or contain relatively low molecular weight prepolymers or oligomers, having a molecular weight of, e.g., about 5,000 or less.

No reason is perceived why any particular monomer, or mixture of monomers, should be critical to the performance of the glass filler of this invention, provided, of course, that the monomer, upon cure, produces an adequate level of adhesion to glass. Thus, the selection of monomers is deemed to be a matter of choice and within the area of ordinary skill and routine experimentation.

The preferred monomers, however, are those containing polymerizable acrylate (including alkyl acrylate, e.g., methacrylate) functionality. As has been stated, adhesive and sealant compositions based on such monomers are well known. The most preferred monomers are those acrylate-terminated compounds containing one, and preferably multiple, urethane linkages in the backbone, in a ring structure incorporated in the backbone, or pendant from the backbone. For convenience, these are all referred to herein as "urethane-acrylates." Cure of these monomers is initiated by free radicals which may be provided from a variety of well-known sources such as peroxy (including hydroperoxy) and perester compounds, and ultraviolet-sensitive compounds (which constitute a preferred embodiment of this invention, as will be mentioned below).

Among the most desirable of the monomers are those disclosed by Gorman et al. in U.S. Pat. No. 3,425,988. These materials may be regarded as the reaction product of a polyisocyanate (e.g., toluene diisocyanate) with a mono-acrylate having a reactive hydrogen atom in the alcoholic portion thereof (e.g., hydroxypropyl methacrylate).

While the Gorman et al. patent is incorporated herein by reference and should be consulted for details, in essence the preparation of the Gorman et al. monomers involves the reaction of a monofunctionally substituted alkyl or aryl acrylate ester containing an active hydrogen atom on the functional substituent. This monofunctional, acrylate-terminated material is reacted with an organic polyisocyanate in suitable proportions so as to convert essentially all of the isocyanate groups to urethane or ureide groups. The monofunctional alkyl and aryl acrylate esters are preferably the acrylates and methacrylates containing hydroxy or amino functional groups on the nonacrylate portion thereof. Acrylate esters suitable for use have the formula

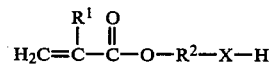

wherein X is selected from the group consisting of —O— and

$R^3$ is selected from the group consisting of hydrogen or lower alkyl of 1 through 7 carbon atoms; $R^1$ is a member selected from the class consisting of hydrogen, chlorine and methyl and ethyl radicals; and $R^2$ is a divalent organic radical selected from the group consisting of lower alkylene of 1 through 8 carbon atoms, phenylene and naph-thylene. These groups upon proper reaction with a polyisocyanate, yield a sealant monomer of the following general formula:

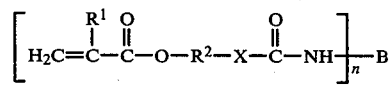

wherein n is an integer from 2 to about 6; B is a polyvalent organic radical selected from the group consisting of alkyl, alkenyl, cycloalkyl, cycloalkenyl, aryl, aralkyl, alkaryl and heterocyclic radicals both substituted and unsubstituted; and $R^1$, $R^2$ and X have the meanings given above.

The hydroxy and amine containing materials suitable for use in the preparation of the above monomeric products are examplified by but not limited to such materials as hydroxy ethyl acrylate, hydroxy ethyl methacrylate, amino ethyl methacrylate, 3-hydroxy propyl methacrylate, amino propyl methacrylate, hydroxy hexyl acrylate, t-butylaminoethyl methacrylate, hydroxy octyl methacrylate, and the like.

The preferred polyisocyanates which may be used in preparing these monomers comprise the higher alkenyl diisocyanates, the cycloalkenyl diisocyanates and the aromatic diisocyanates containing more than 8 carbon atoms and preferably from 15 to 30 carbon atoms, such as, for example, octamethylene diisocyanate, durene diisocyanate, and 4,4'-diphenyl diisocyanate.

The proportions in which the reactants may be combined can be varied somewhat; however, it is generally preferred to employ the reactants in chemically equivalent amounts up to a slight excess, e.g., 1 equivalent excess of the polyisocyanate. As used herein the expression "chemically equivalent amount" refers to the amount needed to furnish one isocyanate group per hydroxy or amine group.

The reactions may be accomplished in the presence or absence of diluents. Preferably diluents which include the hydrocarbons, such as aliphatic, cycloaliphatic and aromatic hydrocarbons, for example, benzene, toluene, cyclohexane, hexane, heptane and the like, are employed but other diluents, such as methyl isobutyl ketone, diamyl ketone, isobutyl methacrylate, and cyclohexyl methacrylate can also be beneficially utilized if desired, especially where complete compatibility with the sealant system is desired.

The temperature employed in the reaction may also vary over a wide range. Where the components are combined in approximately chemical equivalent amounts or with slight excess of the isocyanate reactant, useful temperatures may vary from room temperature or below, e.g., 10° C., to 15° C., up to and including temperatures of 100° C. to 175° C. Where reacting the simpler isocyanates, the components are preferably combined at or near room temperature, such as temperatures ranging from 20° C. to 30° C. In the preparation of the high molecular weight isocyanate adducts using an excess of the isocyanate, the reactants may be combined at room temperature or preferably heated at temperatures ranging from about 40° C. to about 150° C. Reactions conducted at about 90° C. to 120° C. have been found to proceed quite smoothly.

Various other useful urethane-acrylate type monomers have been developed recently by Baccei. One of these monomers, described in copending application Ser. No. 546,250, filed Feb. 3, 1975, comprises a urethane-acrylate-capped polybutadiene polyol or polyamine. Another related monomer, described in copending application Ser. No. 557,740, filed Mar. 12, 1975, comprises a urethane-acrylate-capped poly(methylene)ether polyol. Still another related monomer, described in copending application Ser. No. 557,564, filed Mar. 12, 1975, comprises a urethane-acrylate-capped vinyl grafted poly(alkylene)ether polyol. These monomers may be viewed as one-component polymerizable block copolymers (prepolymers) having rigid and flexible segments. This is achieved by the chemical linking of precursor "prepolymers" which are subsequently "capped" with acrylate, e.g., methacrylate, functionality.

Other useful monomers, not containing urethane linkages, are those acrylates derived from bisphenol-A, such as bisphenol-A dimethacrylate, hydrogenated bisphenol-A dimethacrylate and ethoxylated bisphenol-a dimethacrylate.

Still other useful monomers are the alkylene glycol diacrylates having the general formula:

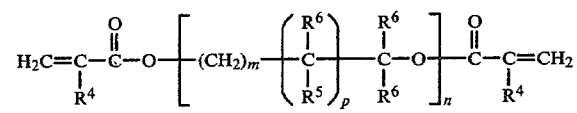

wherein $R^6$ represents a radical selected from the group consisting of hydrogen, lower alkyl of 1–4 carbon atoms, hydroxy alkyl of 1–4 carbon atoms, and

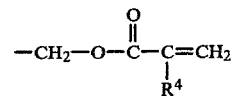

$R^4$ is a radical selected from the group consisting of hydrogen, halogen, and lower alkyl of 1–4 carbon atoms; $R^5$ is a radical selected from the group consisting of hydrogen, —OH and

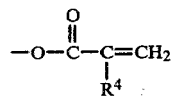

m is an integer equal to at least 1, e.g., from 1 to 8 or higher, for instance, from 1 to 4; n is an integer equal to at least 1, for example, 1 to 20 or more; and p is 0 or 1.

As has been indicated, adhesive/sealant compositions based on the above monomers curve via a free radical mechanism. Any suitable source of free radicals may be used, e.g., peroxides, such as benzoyl peroxide, methylethyl ketone peroxide, and the like. In general, cure speed is enhanced by application of moderate heat.

If desired, the compositions may also be rendered anaerobic by inclusion of a hydroperoxy initiator. A number of such initiators are well known in the anaerobic art, e.g., cumene hydroperoxide, paramethane hydroperoxide, tertiary butyl hydroperoxide, and peresters which hydrolyze to peroxides such as tertiary butyl perbenzoate, and the like. The amount of such peroxy and hydroperoxy compounds may vary from about 0.1 to about 10, preferably about 1 to about 5, percent by weight of the composition exclusive of the filler.

The use of ultraviolet (UV) initiators in the compositions of this invention is especially preferred, since cure is performed rapidly at room temperature and the bonds and/or seals formed have been found to resist thermal cycling unusually well. Without intending to be bound to any particular theory, it is believed that the glass filler of this invention has the ability to transmit ultraviolet radiation throughout the entire thickness of the bond line, thereby permitting uniform and complete cure through relatively thick bonds, e.g., at least 5 mils or more.

UV initiators are typically used in concentration of about 0.1 to about 10%, preferably about 3 to about 8% by weight based on the composition exclusive of the filler. Suitable UV initiators generally will contain at least one carbonyl-containing compound selected from:

(a) $C_{1-6}$ straight or branched chain alkyl diones; (b) metal carbonyls of the formula $M_x(CO)_y$ wherein M is a metal atom, x is 1 or 2, and y is an integer determined by the total valence of the metal atoms, generally from 4 to 10; and (c) carbonyl compounds of the general formula

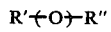

in which R′ is a $C_{1-10}$ alkyl, aryl, aralkyl or alkaryl radical, and R″ is R′ or H. R′ or R″ can contain any substituents which do not adversely affect the compound in serving its intended function. For example R′ or R″ can be alpha-substituted with an alkyl, aryl, alkaryl, alkoxy or aryloxy radical, or with an amino or a mono- or dialkylamino derivative thereof, all the above substituents containing up to about six carbon atoms. In addition R′ and R″, taken together with the carbonyl group to which they are attached, may represent an aromatic or heterocyclic ketone containing up to about sixteen (16) carbon atoms.

Preferred polymerization initiators are acetophenone, benzophenone and 1- and 2-acetonaphthone. Others are 2,3-butadione, 2,4-dimethyl-3-pentanone, 1- and 2-naphthaldehyde, p-phenylacetophenone, n-propiophenone, fluoren-9-one, xanthen-9-one and 4,4′-bis-dimethylaminobenzophenone. The preferred metal carbonyls are $Mn_2(CO)_{10}$, $Fe(CO)_5$, and $Re_2(CO)_{10}$. Others are $Cr(CO)_6$, $Co_2(CO)_8$, $Ni(CO)_4$ and $Mo(CO)_6$.

Polymerization accelerators may also be advantageously included, particularly when the composition has anaerobic curing properties. Such accelerators include a variety of secondary and tertiary organic amines as well as acidic compounds such as sulfimides (e.g., benzoic sulfimide), which are also known in the art. The accelerators may be used at a concentration range of about 0.1 to about 5%, preferably about 1 to about 2%, by weight of the composition exclusive of the filler.

Cure of the monomers can be accelerated by use of surface primers, such as those based upon mercaptobenzothiazole or tetramethyl thiourea. Primers of these types are described in U.S. Pat. Nos. 3,625,930 and 3,970,505. Other types of primers known to the art may also be effectively used. An advantage of the use of such primers is that they tend to enhance the ability of the monomeric adhesive to cure through relatively large gaps. Moderate heat, typically in the range of about 150°-250° F. may also be used to accelerate the cure and improve the gap-curing. Use of heat should be experimented with, however, since heat may tend to reduce ultimate bond strength in some cases. This effect can be largely counterbalanced, however, by use of silanes or silanized glass.

It appears to be important that the adhesive composition be thixotropic, i.e., that its viscosity characteristics be such that the glass filler mixture be maintained in suspension and without substantial separation of relatively low density microballoons and the relatively high density solid glass beads and fibers. While the filler need not remain suspended indefinitely, the suspension should be maintained reasonably homogeneously for at least a sufficient time for the composition to gel, i.e., cure sufficiently that particle separation due to viscosity difference will no longer occur. It has been found that a composition (prior to adding glass filler) viscosity* of about 5,000 to about 10,000, preferably about 6,500 to about 7,500, cps will achieve the desired result. As a corollary determination, expressed in terms of thixotropy, it appears that the ratio of viscosity at 2.5 rpm to that at 20 rpm (Brookfield RV, #6 spindle, 25° C.) should be at least about 1.4. Viscosity ratios over 2.0 may be used, if desired, if special use circumstances so dictate, but no advantage would be expected in relation to this invention.

*All viscosities stated herein are measured at 25° C. using a Brookfield Model RV viscometer, #6 spindle at 20 rpm.

In some cases the viscosity properties of the composition as is may be adequate to permit the desired suspension of the filler. Optionally, however, there may be added a soluble thixotropic agent or thickener in sufficient quantity to produce the desired viscosity. While selection of a thixotropic agent is deemed to be merely a matter of choice and well within the skill of the art, a silaceous, lattice-forming agent (such as fumed silica) is preferred. When used, the thixotropic agent concentration would typically be about 1 to about 5%, preferably about 1.5 to about 3%, by weight of the composition exclusive of the glass filler.

Other additives, such as adhesion enhancers, plasticizers, dyes, etc., are also known in the art and may advantageously be incorporated where functionally desired, provided only that they do not interfere with the functioning of the filler for its intended purpose. This, of course, can be determined by simple experimentation. As adhesion enhancers there may be particularly noted the family of compounds known as silanes, which are well known and commonly used in glass-containing formulations.

Another class of additives, having particular use in high-temperature applications are the compounds having maleimide or nadic functionality, such as disclosed in copending application Ser. No. 513,609, filed Oct. 10, 1974.

EXAMPLES

The following examples are presented for illustration only and are in no way intended as limitations on the invention. All concentrations are by weight.

Example 1

An adhesive was prepared by mixing the following:

37 parts . . . Free radical-curable monomer prepared by mixing approximately equal parts of a reaction product of toluene diisocyanate, hydrogenated bisphenol-A and hydroxypropyl methacrylate with a reaction product of toluene diisocyanate, polypropylene oxide triol and hydroxyethyl methacrylate 16 parts . . . Poly(1,3-butylene glycol adipate), average molecular weight=ca. 1800 (plasticizer)

1.4 parts . . . fumed silica 0.5 part . . . silane methacrylate (adhesion promoter)

28.6 parts . . . hydroxyalkyl methacrylates (reactive diluents)

4.4 parts . . . acrylic acid (adhesion promoter)

1.7 . . . alkoxy silane (adhesion promoter)

5.0 parts . . . benzophenone 1.9 parts . . . cumene hydroperoxide 0.4 part . . . benzoic sulfimide 1.0 part . . . aryl amines 0.05 part . . . stabilizers Ninety parts of this mixture were placed in a vessel. To this vessel were added 3.33 parts glass beads $^{(a)}$, 3.33 parts milled glass fibers $^{(b)}$, and 3.33 parts glass microballoons $^{(c)}$, (the order of addition is not critical). The filler mixture was calculated to be 17.2% by volume of the total filled adhesive composition. The total composition was mixed manually for 3-5 minutes until a smooth, lump-free consistency was achieved.

(a) "Microbeads Glas-Shot," Class III, No. MS-M, 149-74 microns, bulky density 2.42-2.99 gm/cc, from Cataphote Div., Ferro Corp., Jackson, Miss.
(b) "MFCF 132," milled through 3/64" screen (nominal 1/32",) type E glass, 0.3-0.6 mil diameter, bulk density 0.4 gm/cc (nominal), from Cataphote Div., Ferro Corp., Jackson, Miss.
(c) "B25B" Glass Bubbles, 20-130 microns, bulk density 0.15 gm/cc (nominal), from 3M Co., St. Paul, Minn.

This filled adhesive was tested by bonding aluminum slugs (1" hexagonal × ½" thick, type 2024-T3 aluminum) to 3"×3"×½" thick pressed plate glass. Aluminum was used because its coefficient of thermal expansion is much greater than that of glass; thick plate glass was used to minimize flexing of the glass. The glass was thoroughly cleaned with detergent. The bonding surface of the aluminum slugs was machined flat, abraded with 220-400 grit emery paper, and degreased with a chlorinated solvent.

Two drops (approximately 0.2 gram) of the filled adhesive were applied to the center of the aluminum bonding surface. The slug was then placed on the glass plate and slight finger pressure was applied to spread the adhesive. A backing plate was placed against the other side of the slug and the glass plate was clamped to the backing plate using two spring clamps, each of which exerted about 40 psi pressure. The bond thickness was about 6 mils, which is considered to be the minimum thickness obtainable with the glass filter mixture used without crushing the filler. Several such specimens were prepared.

Cure of the adhesive was effected by exposing the specimens to UV radiation (3650 Angstroms, 6,000 microwatts per square centimeter). Fixturing of the bond occurred in 25-30 seconds; UV exposure was continued for 5 minutes. The specimens were then stored for 24 hours at room temperature. Bond strength was then measured and found to be 75-85 foot-pounds (torsional shear), on the average.

Cured specimens were placed in an automatic thermal cycling oven operating on a cycle of $-50°$ to $+150°$ C. over a 3-hour period. The test specimens did not fail in 80 cycles, at which time the test was discontinued. The torsional shear strength of the cycled specimens was found to be less than that of uncycled specimens, but was still at a satisfactory level.

In comparison, control specimens (i.e., the above adhesive without the glass filler) failed in one thermal cycle.

Example 2

A primer composition was prepared by dissolving 2% tetramethyl thiourea (TMTU) and 2% vinyl triacetoxysilane (VTAS) in a halocarbon solvent. This is designated "A" in the table below. Another primer was prepared by dissolving 2% tetramethyl thiourea in the same halocarbon. This is designated "B." The primer was applied with a cotton swab to both of the bonding surfaces (aluminum and glass) of Example 1. The solvent was allowed to evaporate at room temperature. Using the filled adhesive of Example 1, as well as that adhesive unfilled, specimens were assembled as in Example 1 and the adhesive was cured for about 2 hours (no UV radiation was used).

Resistance of the bonds to moisture was tested by boiling the specimens in water until the bond failed. Results were as follows:

TABLE I

| Resistance to Boiling Water | |
|---|---|
| Sample | Time to Fail, hours |
| A: Filled adhesive, TMTU/VTAS primed | 150 |
| B: Filled adhesive, TMTU primed | 9-10 |
| C: Unfilled adhesive, TMTU/VTAS primed (control) | 1 |

Example 3

Using the adhesive and glass fillers of Example 1, the filled compositions of Table II were prepared. "Wt. %" refers to the total weight of filler only. For consistency with Example 1, total filler content was held constant at 17.2% by volume, except for samples XVI-XVIII and samples XIX-XXI, which were 5% by volume and 30% by volume, respectively.

TABLE II

| | Fibers | | Beads | | Balloons | |
|---|---|---|---|---|---|---|
| Sample | Wt., gms. | Wt. % | Wt., gms. | Wt. % | Wt., gms. | Wt. % |
| I | 0 | 0 | 0 | 0 | 0 | 0 |
| II | 0 | 0 | 42.8 | 100 | 0 | 0 |
| III | 43.7 | 100 | 0 | 0 | 0 | 0 |
| IV | 0 | 0 | 0 | 0 | 3.9 | 100 |
| V | 21.6 | 50 | 21.6 | 50 | 0 | 0 |
| VI | 3.6 | 50 | 0 | 0 | 3.6 | 50 |
| VII | 15.3 | 77.2 | 2.1 | 10.9 | 2.4 | 11.9 |
| VIII | 2.2 | 11.2 | 15.0 | 76.7 | 2.4 | 12.1 |
| IX | 0 | 0 | 3.6 | 50 | 3.6 | 50 |
| X | 3.3 | 33.3 | 3.3 | 33.3 | 3.3 | 33.3 |
| XI | 6.6 | 55.2 | 2.2 | 18.1 | 3.2 | 26.6 |
| XII | 2.2 | 18.6 | 6.4 | 54.6 | 3.2 | 26.8 |
| XIII | 10.9 | 61.5 | 4.3 | 24.1 | 2.6 | 14.4 |
| XIV | 4.4 | 24.7 | 10.7 | 60.7 | 2.6 | 14.5 |
| XV | 12.0 | 47 | 11.8 | 46.1 | 1.8 | 6.9 |
| XVI | 0.8 | 33.3 | 0.8 | 33.3 | 0.8 | 33.3 |
| XVII | 2.7 | 61.5 | 1.1 | 24.1 | 0.6 | 14.4 |
| XVIII | 3.0 | 47 | 3.0 | 46.1 | 0.5 | 6.9 |
| XIX | 6.9 | 33.3 | 6.9 | 33.3 | 6.9 | 33.3 |
| XX | 22.6 | 61.5 | 8.8 | 24.1 | 5.3 | 14.4 |
| XXI | 24.8 | 47 | 24.3 | 46.1 | 3.7 | 6.9 |

Using the same procedures described in Example 1, specimens were prepared and cured, except that "postcuring" (i.e., room temperature cure after UV exposure) was allowed to occur for 18 hours. The samples were then subjected to a temperature cycle of $-40°$ to $+180°$ F. with eight 3-hour cycles in each 24-hour period. The specimens were examined periodically during the cycling to ascertain when stress cracks first appeared in the glass substrates. Half of the samples were strength-tested upon completion of 10 cycles and the remainder were strength-tested upon completion of 48 cycles. Testing was performed as described in Example 1. Results are shown in Table III.

TABLE III

| | Initial Strength | Thermal Cycles to | Strength after Cycling, ft-lbs. | |
|---|---|---|---|---|
| Sample | ft-lbs. | Glass Stress | 10 cycles | 48 cycles |
| I | 97 | 2-8 | 18 | 19 |
| II | 86 | less than 1 | 20 | 17 |
| III | 96 | 2-48+ | 10 | 83 |
| IV | 96 | less than 1-48+ | 23 | 68 |
| V | 96 | 2-48+ | 19 | 75 |
| VI | 102 | 48+ | 80 | 32 |
| VII | 120 | 1-48+ | 82 | 94 |
| VIII | 115 | 1 | 17 | 26 |
| IX | 90 | 48+ | 82 | 72 |
| X | 94 | 48+ | 85 | 80 |
| XI | 107 | 48+ | 109 | 83 |

TABLE III-continued

| Sample | Initial Strength ft-lbs. | Thermal Cycles to Glass Stress | Strength after Cycling, ft-lbs. | |
|---|---|---|---|---|
| | | | 10 cycles | 48 cycles |
| XII | 107 | 48+ | 110 | 84 |
| XIII | 78 | 48+ | 112 | 65 |
| XIV | 114 | 8–48+ | 92 | 66 |
| XV | 118 | 48+ | 112 | 91 |
| XVI | 100 | 48+ | 103 | 75 |
| XVII | 95 | 48+ | 120 | 75 |
| XVIII | 88 | 48+ | 78 | 75 |
| XIX | 86 | 48+ | 89 | 60 |
| XX | 79 | 48+ | 85 | 50 |
| XXI | 78 | 48+ | 89 | 60 |

Sample I (plain, unfilled adhesive) and Sample II were both very poor in resistance to thermal cycling and in strength after cycling. Samples III–V were so variable in resistance to cycling and so undependable in strength that those formulations would be commercially unacceptable. While Sample VI survived 48 cycles without damaging the glass, the strength at that point was too low to be commercially acceptable. Sample VII, while showing good strength properties, was too variable in its destructive effect on the glass to be commercially acceptable. Sample VIII was poor in all respects after thermal treatment.

The remaining samples illustrate the invention. These samples show the surprising combination of no damage to the glass, plus a commercially acceptable level of strength after completion of 48 thermal cycles.

What is claimed is:

1. A curable adhesive and sealant composition comprising:
   (a) one or more free radical curable monomers or oligomers;
   (b) an initiator of free radical polymerization;
   (c) a thixotropic agent in sufficient quantity to produce a sufficiently high viscosity to maintain the glass filler mixture in suspension at least for the period of time required for the composition to gel; and
   (d) about 5–25% by weight of the total composition of a glass filler mixture consisting essentially of, by weight based on the total glass filler mixture:
      (1) about 5 to about 50% glass microballoons;
      (2) about 10 to about 50% solid glass beads;
      (3) 0 to about 50% milled glass fibers; and
      (4) 0 to about 40% glass powder or glass flakes;
said composition being curable through gaps of at least 5 mils and, when cured, forming a bond or seal which is resistant to destruction by thermal cycling.

2. A composition of claim 1 containing in addition at least one accelerator of free radical polymerization.

3. A composition of claim 1 wherein the initiator is an ultraviolet initiator.

4. A composition of claim 1 wherein the initiator is a hydroperoxide and the composition has anaerobic curing properties.

5. A composition of claim 1 containing no glass powder and about equal parts by weight each of glass microballoons, beads and milled fibers.

6. A composition of claim 1 containing in addition a silane or silanized glass.

7. An ultraviolet curable adhesive and sealant composition, curable through gaps of at least 5 mils and having, when cured, improved resistance to degradation by thermal cycling, comprising:
   (a) one or more acrylate-terminated, urethane-containing free radical curable monomers or oligomers;
   (b) an ultraviolet initiator of free radical polymerization;
   (c) an acidic accelerator of free radical polymerization;
   (d) a fumed silica thixotropic agent in sufficient quantity to produce a viscosity in the composition of about 5,000 to about 10,000 centipoises; and
   (e) about 8–12% by weight of the total composition of a glass filler mixture consisting essentially of, by weight based on the total glass filler mixture:
      (1) about 30–35% glass microballoons;
      (2) about 30–35% solid glass beads; and
      (3) about 30–35% milled glass fibers.

8. A composition of claim 7 wherein the monomer has the formula

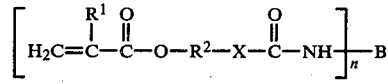

wherein $R^1$ is a member selected from the class consisting of hydrogen, chlorine and methyl and ethyl radicals; $R^2$ is a divalent organic radical selected from the group consisting of lower alkylene of 1 through 8 carbon atoms, phenylene and naphthylene; X is selected from the group consisting of —O— and

$R^3$ is selected from the group consisting of hydrogen and lower alkyl of 1 through 7 carbon atoms; n is an integer from 2 to about 6; and B is a polyvalent organic radical selected from the group consisting of alkyl, alkenyl, cycloalkyl, cycloalkenyl, aryl, aralkyl, alkaryl and heterocyclic radicals both substituted and unsubstituted.

9. A composition of claim 8 wherein the ultraviolet initiator is a benzoin ether.

10. A composition of claim 9 wherein the acidic accelerator is benzoic sulfimide.

11. A composition of claim 7 containing in addition an amine accelerator of free radical polymerization.

12. A composition of claim 7 containing in addition a peroxy initiator of free radical polymerization.

13. A composition of claim 12 wherein the peroxy initiator is cumene hydroperoxide.

14. A composition of claim 7 containing in addition a silane or silanized glass.

* * * * *

UNITED STATES PATENT AND TRADEMARK OFFICE
CERTIFICATE OF CORRECTION

PATENT NO. : 4,309,334

DATED : January 5, 1982

INVENTOR(S) : Robert A. Valitsky

It is certified that error appears in the above-identified patent and that said Letters Patent are hereby corrected as shown below:

Column 3, Line 8: delete the word "in" and insert "is".

Column 3, Line 22: delete the word "resistance" and insert "resistant".

Column 4, Line 48: delete the word "or" and insert "and".

Column 7, Line 8: delete the formula "$R'-(-O-)-R''$" and insert "$R'-(-CO-)-R''$"

Column 8, Line 24: delete the word "desired" and insert "desirable".

Column 8, Line 58: after 1.7... insert "parts".

Column 9, Line 5: delete the word "bulky" and insert "bulk".

Signed and Sealed this

Fourth Day of May 1982

[SEAL]

Attest:

GERALD J. MOSSINGHOFF

Attesting Officer — Commissioner of Patents and Trademarks